(12) United States Patent
Buck et al.

(10) Patent No.: US 11,713,736 B2
(45) Date of Patent: Aug. 1, 2023

(54) CONTROL FLAP FOR CONTROLLED EXHAUST GAS RECIRCULATION AND METHOD FOR ITS PRODUCTION

(71) Applicant: Umfotec GmbH, Northeim (DE)

(72) Inventors: Ralf Buck, Kipfenberg/Schelldorf (DE); Gerald Wedekind, Goettingen (DE); Bodo Waterstraat, Nussloch (DE); Dirk Nagel, Dassel (DE); Thomas Kaiser, Staufenberg (DE)

(73) Assignee: Umfotec GmbH, Northeim (DE)

( * ) Notice: Subject to any disclaimer, the term of this patent is extended or adjusted under 35 U.S.C. 154(b) by 94 days.

(21) Appl. No.: 17/219,793

(22) Filed: Mar. 31, 2021

(65) Prior Publication Data

US 2021/0310449 A1    Oct. 7, 2021

(30) Foreign Application Priority Data

Apr. 1, 2020   (DE) .................. 10 2020 109 049.8

(51) Int. Cl.
*F02M 26/70*    (2016.01)
*F02D 9/10*     (2006.01)
(Continued)

(52) U.S. Cl.
CPC .......... *F02M 26/70* (2016.02); *B29C 45/0001* (2013.01); *F02D 9/04* (2013.01);
(Continued)

(58) Field of Classification Search
CPC .......... F02D 9/1045; F02D 9/04; F02D 9/107; F02D 9/108; F02M 26/70; B29K 2077/00; B29K 2309/08; B29L 2031/506
(Continued)

(56) References Cited

U.S. PATENT DOCUMENTS

| 5,669,350 A | 9/1997 | Altmann et al. |
| 2004/0011988 A1 | 1/2004 | Chini et al. |

(Continued)

FOREIGN PATENT DOCUMENTS

| CH | 699 704 | 4/2010 |
| DE | 44 23 370 | 1/1996 |

(Continued)

OTHER PUBLICATIONS

German Office Action of Feb. 18, 2021.
(Continued)

*Primary Examiner* — Mahmoud Gimie
(74) *Attorney, Agent, or Firm* — Gerald E. Hespos; Michael J. Porco

(57) ABSTRACT

A control flap (1) has a flap body (2) and a circumferential seal (3) capable of sealing upon abutting to a sealing surface (7) of an opening (8). The flap body (2) and the seal (3) are made of elastomers. The seal (3) is joined to the flap body (2) by a pressure plate (4) made of a thermoplastic. The control flap may be made by a method that includes: producing the flap body (2) from a thermoplastic by injection molding; producing the pressure plate (4) from a thermoplastic by injection molding; producing the seal (3) from an elastomer by injection molding; introducing the pressure plate (4) into the undercut (10) of the seal (3); inserting the pressure plate (4) with the seal (3) into the recess (16) of the flap body (2) and bonding the pressure plate (4) and flap body (2).

18 Claims, 4 Drawing Sheets

(51) Int. Cl.
*B29C 45/00* (2006.01)
*B29L 31/00* (2006.01)
*F02D 9/04* (2006.01)
*B29K 77/00* (2006.01)
*B29K 309/08* (2006.01)

(52) U.S. Cl.
CPC ............ *F02D 9/107* (2013.01); *F02D 9/108* (2013.01); *F02D 9/1045* (2013.01); *B29K 2077/00* (2013.01); *B29K 2309/08* (2013.01); *B29L 2031/7506* (2013.01)

(58) Field of Classification Search
USPC ........................................................ 251/305
See application file for complete search history.

(56) References Cited

U.S. PATENT DOCUMENTS

| | | | | |
|---|---|---|---|---|
| 2013/0037737 | A1* | 2/2013 | Grimwade | ............ F16K 1/2261 251/298 |
| 2016/0061333 | A1 | 3/2016 | Bareis et al. | |

FOREIGN PATENT DOCUMENTS

| | | | | |
|---|---|---|---|---|
| DE | 4423370 | A1 * | 1/1996 | ............ F02D 9/1015 |
| DE | 19516927 | A1 * | 11/1996 | ............ F02D 9/101 |
| DE | 19819364 | A1 * | 11/1999 | ............ F02D 9/1015 |
| DE | 10 2014 112 398 | | 3/2016 | |
| DE | 102014222517 | A1 * | 5/2016 | ............ F02D 9/1045 |
| EP | 0 717 815 | | 9/1999 | |
| KR | 20170054543 | A * | 2/2017 | |

OTHER PUBLICATIONS

Ensinger: Tecadur PBT GF30 natural—Halbzeuge (Runstäbe, Flatten, Hohlstäbe). In: Ensinger GmbH. Rudolf-Diesel-Str. 8, 71154 Nufringen: Datenblatt Tecadur. 2018.—Firmenschrift.

* cited by examiner

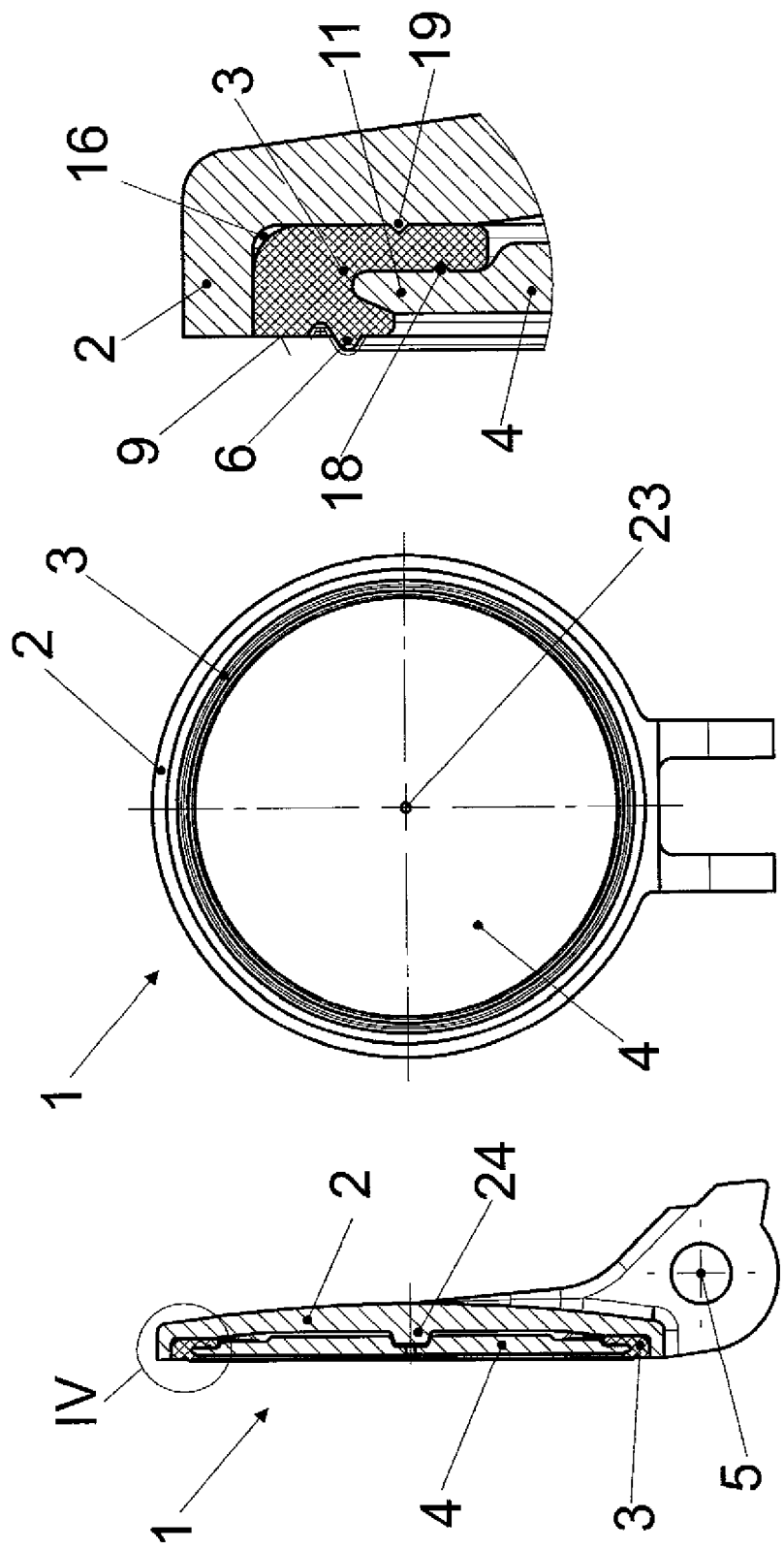

CONTROL FLAP FOR CONTROLLED EXHAUST GAS RECIRCULATION AND METHOD FOR ITS PRODUCTION

BACKGROUND

Field of the Invention

The invention relates to a control flap, consisting of a flap body and a circumferential seal capable of sealing upon abutting, wherein the flap body is made of a thermoplastic and the seal is made of an elastomer.

The invention further relates to a method for producing a control flap.

Related Art

Control flaps are used in modern combustion engines in connection with turbochargers on the cold side of a turbocharger, for example, in order to enable controlled exhaust gas recirculation to the low-pressure side (aspiration side). The exhaust gas recirculation makes it possible to reduce power without using a throttle. This means the more exhaust gas recirculation, the lower the combustion and therefore, the lower the power. This increases the efficiency of the motor while reducing consumption and $CO_2$ emissions accordingly.

A control flap for exhaust gas recirculation on the low-pressure side of a turbocharger is known from EP 0 717 815 B1, which control flap consists of a flap body and a seal in the form of a sealing ring that is capable of sealing upon abutting a sealing surface of an opening to be sealed, wherein the flap body is made of a thermoplastic and the seal is made of an elastomer.

It is suggested to produce such a two-part control flap using a two-component injection molding process (2C injection molding).

It is disadvantageous in this regard, however, especially when the control flap is used for controlled exhaust gas recirculation on the low-pressure side of a turbocharger, that in their installed state, the plastics are permanently exposed to temperatures of approx. 230° C. At this temperature level, cost-effective high-temperature plastics, such as polyamide 4.6, are in their limit range, which causes the mechanical properties of the plastic to significantly decline and the surface of the plastic can be damaged. The consequences are component failure or loss of the sealing function. For example, the surface can accumulate soot. This presents the risk that pieces of the surface of the plastic detach and damage the engine or turbocharger, or the injection-molded rubber seal no longer securely adheres to the surface of the plastic.

Other plastics, such as polyphenylsulfide (PPS) only form an adhesive bond with an elastomer, such as rubber, for example, with great difficulty, for which reason the required service life for such components often cannot be maintained. Depending on processing, coupling agents have to be applied to the plastic/thermoplastic before attachment of the elastomer by vulcanization takes place. Often such coupling agents are composed of a primer, which has the function of promoting a good bond to the plastic, i.e. the thermoplastic, while an adhesive has the function of promoting a good bond to the elastomer. To ensure adhesion of the primer to the plastic, the surface of the plastic must undergo a pre-treatment, such as degreasing, or reactivation by plasma treatment.

Some plastics are highly "media resistant." In this case, such plastics only bond to the coupling agent with great difficulty. In order to achieve at least a certain adhesion with the coupling agent, the surface is reactivated, which is enabled by plasma treatment of the surface, for example. Disadvantages of this process are, on the one hand, the high process costs, and on the other hand, the short time window during which any further processing must be performed.

The present invention seeks to solve the problem of improving the known control flap such that a cost-effective, permanent and secure joint between a flap body made of a thermoplastic and a seal made of an elastomer is achieved.

The invention additionally seeks to solve the problem of providing a method for producing the control flap according to the invention.

SUMMARY

This disclosure relates to a control flap that comprises a flap body and a circumferential seal that is capable of sealing upon abutting a sealing surface of an opening to be sealed. The flap body is made of a thermoplastic and the seal is made of an elastomer. The seal is joined to the flap body via a pressure plate made of a thermoplastic.

Within the meaning of the present invention, "seal" is intended to mean both a sealing ring as well as a circumferential seal that departs from the circular form, since the control flap with the flap body, and correspondingly, the opening to be sealed by the control flap, do not necessarily have to be circular.

Surprisingly, it has been shown that the three-part flap design of the control flap according to the invention is not only more secure and permanent in terms of its bond between the flap body and seal, but also more cost-effective to produce than the known two-part flap design.

According to one embodiment, the flap body has a recess for accommodating the seal with the pressure plate, and the recess forms a circumferential front abutment surface in the direction of the seal. The circumferential inner contact surface can also be annular.

In another embodiment, the seal has a convex sealing lip in the direction of the sealing surface of the opening to be sealed. The convex form of the sealing lip enables an especially elastic and good seal.

To accommodate an edge section of the pressure plate, the seal can additionally have an undercut. The undercut allows the pressure plate to be "clicked into," i.e. relatively rigidly inserted into, the seal made of an elastomer. Next, the pressure plate together with the seal can be inserted into the recess of the flap body and welded, for example.

An edge section of the pressure plate toward the adjacent inner contact surface of the seal may have first fixing lugs. The first fixing lugs are implemented as convex or conical protrusions that press into the adjacent inner contact surface of the seal and support its fastening.

The circumferential front abutment surface of the form of the flap body may have second fixing lugs toward the adjacent rear contact surface of the seal. The second fixing lugs also may be implemented as convex or conical protrusions that press into the adjacent rear contact surface of the seal and support its fastening. In this manner, the seal is fastened, both at its inner contact surface as well as along its distanced rear contact surface, by the fixing lugs.

According to another embodiment, the pressure plate has a central receiving indentation with a central ventilation opening. The recess of the flap body has a central connection frustum that is received by the receiving indentation of the pressure plate. When the receiving indentation and connection frustum are joined together, air can escape through the central ventilation opening. The pressure plate and the flap body can be bonded to one another by welding, for example, at the central connection frustum of the flap body and the receiving indentation of the pressure plate.

The pressure plate and flap body both may be made of the same thermoplastic, especially for welding. Thus, welding can be accomplished advantageously by ultrasound welding or friction welding, for example.

The thermoplastic may comprise at least one polyamide. To increase rigidity and temperature resistance, the thermoplastic has a glass fiber content. A thermoplastic known under the ISO 1874 designation as "PA66+PA6, MHR, 14-11ON, GF35" has proven itself especially successful.

According to another embodiment, the seal is made of an elastomer. A fluoro-rubber (FKM) has proven itself especially successful.

The method for producing the control flap may comprise the following steps:
a) producing the flap body from a thermoplastic using an injection molding process;
b) producing the pressure plate from a thermoplastic using an injection molding process;
c) producing the seal from an elastomer using an injection molding process;
d) introducing the pressure plate into the undercut of the seal;
e) inserting the pressure plate with the seal into the recess of the flap body, and
f) bonding the pressure plate and flap body.

The method according to the invention avoids a labor-intensive and expensive two-component injection molding process and also avoids the use of coupling agents and other surface treatments applied to the individual material components.

Additional features and advantages of the invention are evident from the following detailed description and the drawings.

BRIEF DESCRIPTION OF THE DRAWINGS

FIG. 2 shows a lateral cross-section view of the control flap from FIG. 1.

FIG. 3 shows a lateral view of the control flap of FIG. 2 from Direction III.

FIG. 4 shows a lateral cross-section view of Detail IV from FIG. 2.

DETAILED DESCRIPTION

A control flap 1 that can be used, among other things, as a control flap (exhaust gas recirculation flap) for exhaust gas recirculation on the low-pressure side of a turbocharger (not shown), essentially consists of a flap body 2, a seal 3 and a pressure plate 4.

Figure 1:
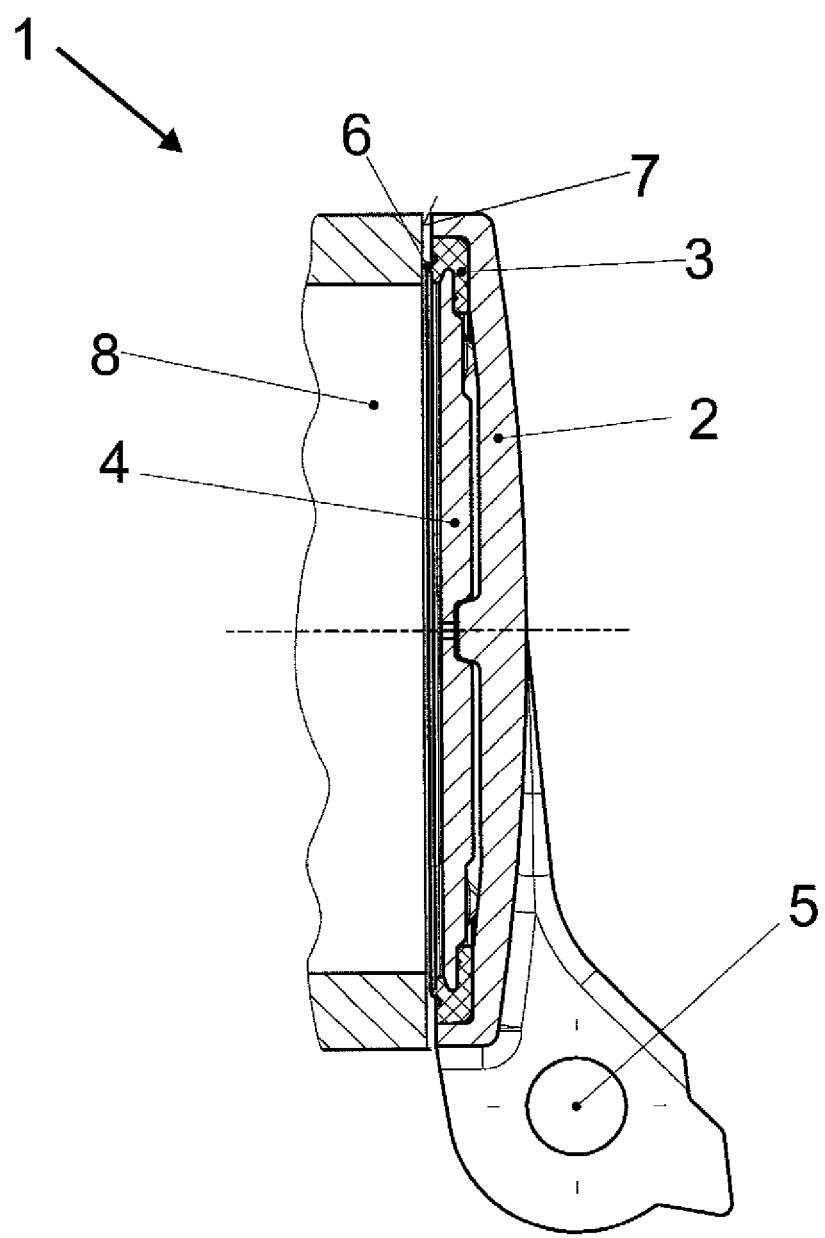
FIG. 1 shows a lateral cross-section view of a control flap with opening to be sealed and sealing surface.
Figure 7:
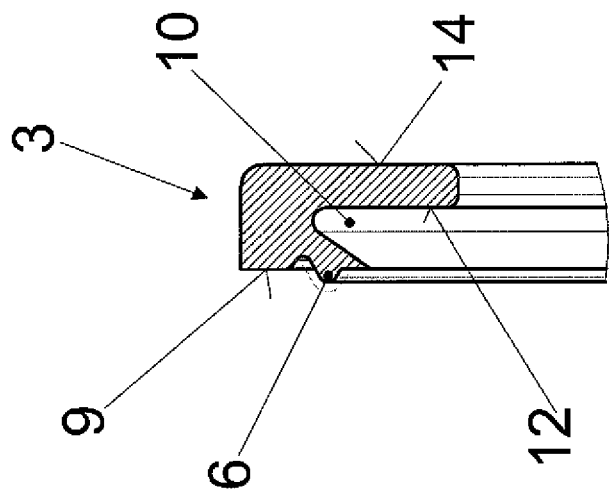
FIG. 7 shows a lateral cross-section view of Detail VII from FIG. 5.
Figure 6:
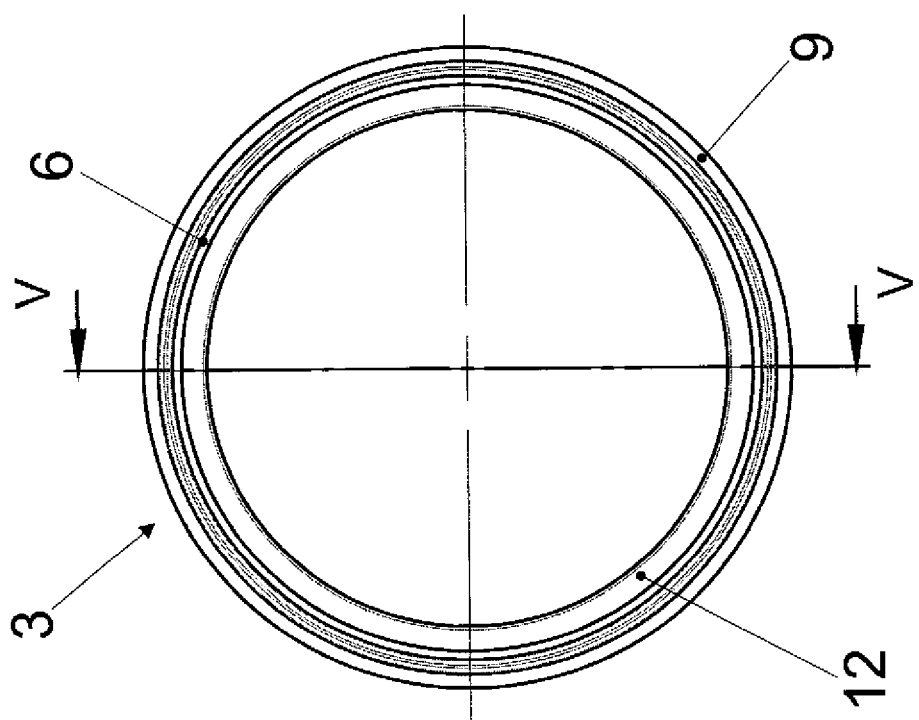
FIG. 6 shows a lateral view of the seal from FIG. 5 from Direction VI.
Figure 5:
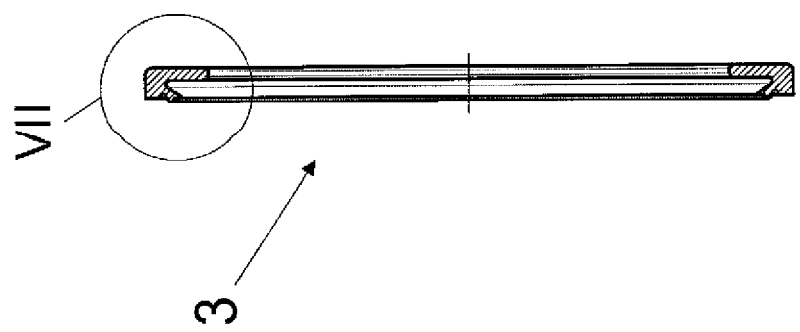
FIG. 5 shows a lateral cross-section view of the seal from FIG. 1.
Figure 9:
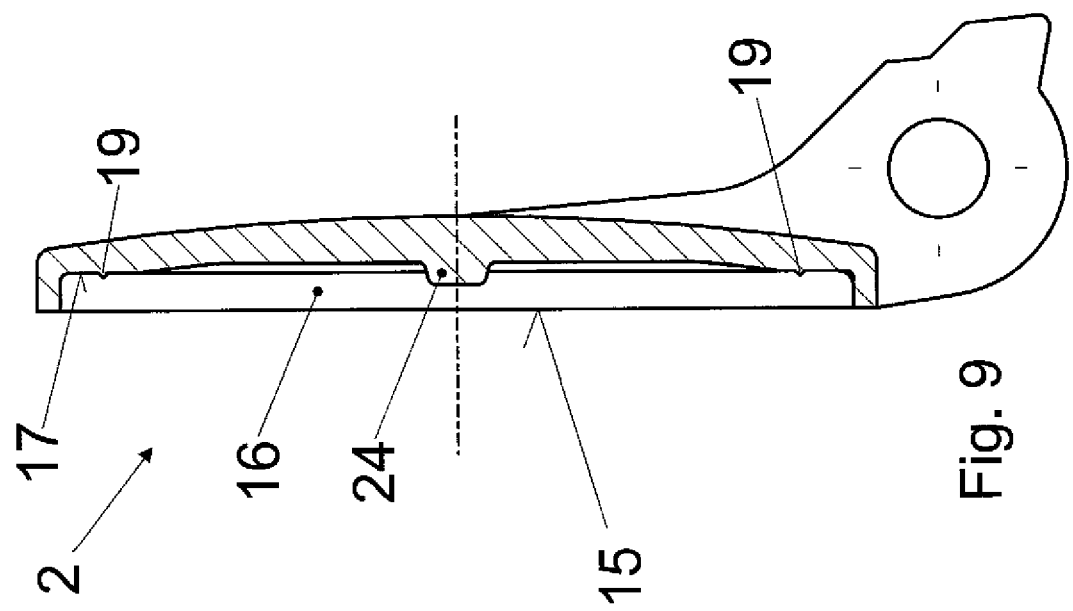
FIG. 9 shows a lateral cross-section view of the flap body from FIG. 1.
Figure 8:
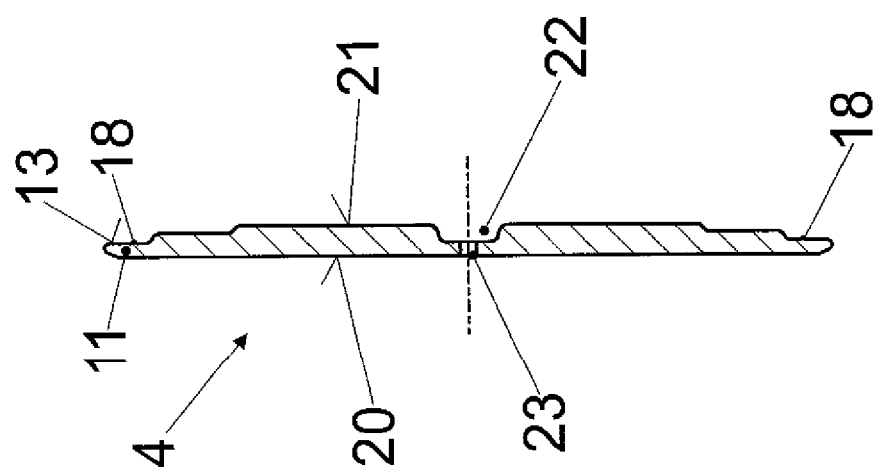
FIG. 8 shows a lateral cross-section view of the pressure plate from FIG. 1.

According to the embodiment of FIG. 1, the control flap 1 is mounted to be pivotable around an axis 5 and, in a sealing position, abuts with a sealing lip 6 of its seal 3 against a sealing surface 7 of an opening 8 to be sealed. Due to the required rigidity, the flap body 2 and the pressure plate 4 are made of a thermoplastic. Although in principle, different thermoplastics can be used for the flap body 2 and the pressure plate 4, bonding a flap body 2 and pressure plate 4 by means of a welding process has proven successful using the same thermoplastic. Due to the required elasticity of the seal 3, making the seal 3 from an elastomer has proven successful.

According to the embodiment of FIGS. 1 to 9, the seal 3, facing toward the sealing surface 7, has a sealing lip 6 that is convex in shape. Furthermore, the seal 3, facing toward the sealing surface 7, has an annular facing surface 9, beyond which the sealing lip 6 projects in the direction of the sealing surface 7, i.e. facing away from the pressure plate 4. In a direction away from the sealing lip 6 and the facing surface 9 and toward the flap body 2, the seal 3 has an undercut 10 for receiving a circumferential edge section 11 of the pressure plate 4. The undercut 10 has an inner contact surface 12 upon which the pressure plate 4 with a rear abutment surface 13 of its edge section 11 abuts. At a distance from the inner contact surface 12, the seal 3 has a rear contact surface 14.

The flap body 2, on its front side 15 facing toward the sealing surface 7 to be sealed, has a recess 16 with a circumferential front abutment surface 17, upon which the seal 3 with its rear contact surface 14 abuts in the assembled state.

In the exemplary embodiments, the rear abutment surface 13 of the pressure plate 4 has, at its edge section 11 toward the adjacent inner contact surface 12 of the seal 3, first fixing lugs 18. The first fixing lugs 18 are shaped as convex or conical protrusions that press into the adjacent inner contact surface 12 of the seal 3 and support the fixing of the seal 3 in the assembled state. Accordingly, the front abutment surface 17 of the flap body 2 has second fixing lugs 19 toward the rear contact surface 14 of the seal 3. The second fixing lugs 19 are formed as convex or conical protrusions, like the first fixing lugs 18. The second fixing lugs 19 press into the adjacent rear contact surface 14 of the seal 3 and also support the fixing of the seal 3 in the assembled state. In this manner, the seal 3 is additionally fixed both at its inner contact surface 12 as well as at its distanced rear contact surface 14 by the fixing lugs and is rigidly clamped in the assembled state between the pressure plate 4 and the flap body 2.

By means of the undercut 10, the pressure plate 4 made of a thermoplastic can be "clicked into," i.e. relatively rigidly set into, the seal 3 made of an elastomer. Next, the pressure plate 4 together with the seal 3 can be set into the recess 16 of the flap body 2 and the pressure plate 4 can be bonded to the flap body 2 by welding, for example.

The pressure plate 4, toward the opening 8 to be sealed, has a front surface 20 and toward the front abutment surface 17 of the flap body 2, has a rear surface 21 with a central frustum-shaped receiving indentation 22. The pressure plate 4 can additionally have a central ventilation opening 23 connected to the receiving indentation 22. The recess 16 of the flap body 2 has a central connection frustum 24 that is at least partially received by the receiving indentation 22 of the pressure plate 4. When the receiving indentation 22 and connection frustum 24 are joined together, air can escape through the central ventilation opening 23. The pressure plate 4—with clicked-in, i.e. set in seal 3—and the flap body 2 can be bonded together via the central connection frustum 24 of the flap body 2 and the receiving indentation 22 of the pressure plate 4, such as by plastic welding.

A thermoplastic based on at least one polyamide is suitable for the thermoplastic for both the flap body 2 as well as the pressure plate 7.

To increase rigidity and temperature resistance, the thermoplastic has a glass fiber content. A thermoplastic known in the ISO 1874 designation as "PA66+PA6, MHR, 14-11ON, GF35" has proven itself especially well.

An elastomer that is a fluoro-rubber has proven a suitable elastomer for the seal 3.

LIST OF REFERENCE NUMBERS 1 control flap
2 flap body
3 seal
4 pressure plate
5 axis
6 sealing lip of 3
7 sealing surface
8 opening
9 facing surface of 3
10 undercut of 3
11 edge section of 4
12 inner contact surface of 10
13 rear abutment surface of 4/11
14 rear contact surface of 3
15 front side of 2
16 recess of 2
17 front abutment surface of 2
18 first fixing lugs of 13
19 second fixing lugs of 17
20 front surface of 4
21 rear surface of 4
22 receiving indentation of 4'
23 ventilation opening of 4
24 connection frustum of 2

What is claimed is:

1. A control flap (1) for sealing against a sealing surface (7) that surrounds an opening (8), the control flap (1) comprising:
   a flap body (2) made of a thermoplastic and having a recess (16) with a front surface (17) facing toward the opening (8) when the control flap (1) is in a closed position, a rim surrounding the recess (16) and facing toward a part of the sealing surface (7) spaced outward of the opening (8) when the control flap (1) is in the closed position;
   a circumferential seal (3) that is made of an elastomer, the circumferential seal (3) having a rear contact surface (14) engaged against the front surface (17) of the recess (16) in the flap body (2), an outer circumferential surface engaged against an inner circumferential surface of the rim, an inner circumferential undercut (10) and a front surface capable of sealing upon abutting the sealing surface (7) that surrounds the opening (8) to be sealed when the flap body (2) is in the closed position; and
   a pressure plate (4) made of a thermoplastic, the pressure plate (4) having a rear surface (21) held against a part of the front surface (17) of the recess (16) in the flap body (2) and an outer circumferential edge section (11) engaged in the circumferential undercut (10) of the seal (3) for holding the seal (3) in the recess (16).

2. The control flap (1) of claim 1, wherein the front surface of the seal (3) has a convex sealing lip (6) facing toward the sealing surface (7) when the control flap (1) is in the closed position.

3. The control flap (1) of claim 1, wherein the outer circumferential edge section (11) of the pressure plate (4) has first fixing lugs (18) projecting toward the inner circumferential undercut (10) of the seal (3).

4. The control flap (1) of claim 3, wherein the circumferential front surface (17) of the recess (16) of the flap body (2) has second fixing lugs (19) projecting toward the rear contact surface (14) of the seal (3).

5. The control flap (1) of claim 1, wherein the pressure plate (4) has a central receiving indentation (22) with a central ventilation opening (23), the recess (16) of the flap body (2) has a central connection frustum (24) that is received by the receiving indentation (22) of the pressure plate (4).

6. The control flap (1) of claim 1, wherein the pressure plate (4) and the flap body (2) are made of the same thermoplastic.

7. The control flap (1) of claim 1, wherein the pressure plate (4) is welded to the flap body (2).

8. The control flap (1) of claim 1, wherein the thermoplastic comprises at least one polyamide and has a glass fiber content.

9. The control flap (1) of claim 1, wherein the seal (3) is made of a fluoro-rubber.

10. A method for producing the control flap of claim 1, comprising:
   a) producing the flap body (2) from a thermoplastic using an injection molding process;
   b) producing the pressure plate (4) from a thermoplastic using an injection molding process;
   c) producing the seal (3) from an elastomer using an injection molding process;
   d) introducing the pressure plate (4) into the undercut (10) of the seal (3);
   e) inserting the pressure plate (4) with the seal (3) into the recess (16) of the flap body (2); and
   f) bonding the pressure plate (4) and the flap body (2).

11. The control flap (1) of claim 1 wherein the flap body (2) is pivotable about an axis (5) that is spaced radially outwardly from the opening (8).

12. A control flap (1) comprising a flap body (2) and a circumferential seal (3) that is capable of sealing upon abutting a sealing surface (7) of an opening (8) to be sealed, the flap body (2) being made of a thermoplastic and the seal (3) being made of an elastomer, wherein
   the seal (3) is joined to the flap body (2) via a pressure plate (4) made of a thermoplastic;
   the flap body (2) has a recess (16) for receiving the seal (3) with the pressure plate (4), and the recess (16) forms a circumferential front abutment surface (17) toward the seal (3);
   the pressure plate (4) has a central receiving indentation (22) with a central ventilation opening (23); and
   the recess (16) of the flap body (2) has a central connection frustum (24) that is received by the receiving indentation (22) of the pressure plate (4).

13. A control flap (1) comprising a flap body (2) and a circumferential seal (3) that is capable of sealing upon abutting a sealing surface (7) of an opening (8) to be sealed, the flap body (2) being made of a thermoplastic and the seal (3) being made of an elastomer, wherein the seal (3) is joined to the flap body (2) via a pressure plate (4) made of a thermoplastic;

the flap body (2) has a recess (16) for receiving the seal (3) with the pressure plate (4), and the recess (16) forms a circumferential front abutment surface (17) toward the seal (3);

the pressure plate (4) has a central receiving indentation (22) with a central ventilation opening (23); and the recess (16) of the flap body (2) has a central connection frustum (24) that is received by the receiving indentation (22) of the pressure plate (4).

14. A control flap (1) for sealing against a sealing surface (7) that surrounds an opening (8), the control flap (1) comprising:

a flap body (2) made of a thermoplastic and having a recess (16) with a front surface (17) facing toward the opening (8) when the control flap (1) is in a closed position, the front surface of the recess (16) of the flap body (2) having a central projection (24), a rim surrounding the recess (16) and facing toward a part of the sealing surface (7) spaced outward of the opening (8) when the control flap (1) is in the closed position;

a circumferential seal (3) that is made of an elastomer, the circumferential seal (3) having a rear contact surface (14) engaged against the front surface (17) of the recess (16) in the flap body (2), an outer circumferential surface engaged against an inner circumferential surface of the rim, an inner circumferential surface and a front surface capable of sealing upon abutting the sealing surface (7) that surrounds the opening (8) to be sealed when the flap body (2) is in the closed position; and a pressure plate (4) made of a thermoplastic, the pressure plate (4) having a rear surface (21) with a central receiving indentation (22) having a central ventilation opening (23), the central receiving indentation (22) engaging the central projection (24) of the flap body (2) to hold the pressure plate (4) in the recess (16) in the flap body (2) with an outer circumferential edge section (11) of the pressure plate (4) engaging the inner circumferential surface of the seal (3) for holding the seal (3) in the recess (16).

15. The control flap (1) of claim 14, wherein the pressure plate (4) and the flap body (2) are made of the same thermoplastic.

16. The control flap (1) of claim 14, wherein the central receiving indentation (22) is welded to the central projection (24) of the flap body (2).

17. The control flap (1) of claim 14, wherein
the outer circumferential edge section (11) of the pressure plate (4) has first fixing lugs (18) projecting toward the inner circumferential surface of the seal (3).

18. The control flap (1) of claim 17, wherein
the circumferential front surface (17) of the recess (16) of the flap body (2) has second fixing lugs (19) projecting toward the rear contact surface (14) of the seal (3).

* * * * *